US008615592B2

(12) United States Patent
Kashyap

(10) Patent No.: US 8,615,592 B2
(45) Date of Patent: Dec. 24, 2013

(54) CONNECTION MAINTENANCE WHEN ONE NODE TAKES OVER FOR ANOTHER NODE

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 2049 days.

(21) Appl. No.: 11/404,640

(22) Filed: Apr. 15, 2006

(65) Prior Publication Data

US 2007/0245003 A1    Oct. 18, 2007

(51) Int. Cl.
*G06F 15/16* (2006.01)
*G06F 15/173* (2006.01)

(52) U.S. Cl.
USPC .......................................... 709/227; 709/223

(58) Field of Classification Search
USPC ................................................ 709/223, 227
See application file for complete search history.

(56) References Cited

U.S. PATENT DOCUMENTS

| 6,601,101 B1 * | 7/2003 | Lee et al. ....................... 709/227 |
| 6,711,166 B1 | 3/2004 | Amir et al. |
| 6,880,013 B2 * | 4/2005 | Kashyap ....................... 709/227 |
| 2003/0014684 A1 | 1/2003 | Kashyap |
| 2003/0103452 A1 * | 6/2003 | Le et al. ........................ 370/229 |

OTHER PUBLICATIONS

W. Almesberger, "TCP Connection Passing," Proceedings of the Linux Symposium (vol. 1), Jul. 21-24, 2004, Ottawa, Ontario, Canada.

* cited by examiner

*Primary Examiner* — David Lazaro
*Assistant Examiner* — Xiang Yu
(74) *Attorney, Agent, or Firm* — Steven Bennett

(57) ABSTRACT

A connection between a first node and a second node is maintained within a computer network. The second node receives first data from the first node and places the first data received within a data window. A third node taking over the connection from the second node receives second data from the first node and places the second data received within the data window. Upon the data window being completely filled, the third node closes the window and responds to the first node with a zero data window. The connection between the first node and the second node is maintained by the third node.

30 Claims, 4 Drawing Sheets

CONNECTION MAINTENANCE WHEN ONE NODE TAKES OVER FOR ANOTHER NODE

FIELD OF THE INVENTION

The present invention relates generally to one node taking over for another node, such as one server taking over for another server when the latter server needs to be shut down, and more particularly to maintaining the connections of the node that is being taken over by the node that is taking over.

BACKGROUND OF THE INVENTION

In a typical client-server networking topology, there are one or more servers that field requests from and send responses to a number of clients. Both the servers and the clients are usually computing devices. For example, in the case of Internet web site hosting, a web site is typically hosted by one or more servers. Clients browsing the web site may issue requests for web site content to the servers, and in response the servers send the web content to the clients. The clients can then display the web site content locally for user viewing.

However, occasionally servers may have to be shut down. Some hardware of the server may not be operating properly, for instance, the server may be scheduled for being upgraded, or the server may be scheduled for routine maintenance. In such situations, it can be important for the server to gracefully shut down. That is, any current connections that the server has with clients are desirably handed off to another server that is to take over for the server that is to be shut down.

Desirably, any current connections that the server to be shutdown has with clients are handed off to the server that is taking over in such a way that the clients are unaware that the handoff is taking place. One approach for one server to take over the connections of another server in this manner is described in the issued U.S. Pat. No. 6,880,013, issued on Apr. 12, 2005, and entitled "Permanent TCP connections across system reboots." In the approach described in that patent application, the server being shutdown advertises a data window of zero, which is also referred to as a zero data window, or a zero window, and which desirably causes the clients to enter a "persist" state until the server taking over is able to receive data from the clients. In this state, the client periodically sends one byte of data to determine if the window has opened. On receiving an acknowledgement indicating that the data window is still zero, the client repeats this probing again. Only when an acknowledgment is received that the window is greater than zero does the client restart regular transmission of data.

The advertisement of a data window by a server to a client means that the server transmits to the client the amount of data that the client is allowed to send to the server. As the client sends the data, the server receives the data, which is referred to as "filling the window." Conversely, the window is emptied as an application program running on the server reads the accepted data into its own buffers. A stack on the server, such as a TCP stack, sends back acknowledgements to the application program running on the server to indicate the amount of data that that can be accepted, as a window that is greater than zero.

Advertising a data window of zero, therefore, means that the server is telling the client that the amount of data that the client is allowed to send to the server is zero bytes. In effect, the client is not allowed to send the server any data at all, because if the client were to send even a single byte of data, the amount of data sent would exceed the size of the window. Furthermore, many clients time out the connection and will terminate the connection after multiple retries occur. However, they will not do so if the window is closed, and therefore the clients will periodically continue to retry sending data. This allows the connection to be kept alive.

However, some types of clients do not handle receiving a data window of zero well in an abrupt manner. The maximum size of the window, which is the amount of buffering that the peer allows, is sent at the time of the connection establishment. The client calculates that the server must have had space to accept more data based on the amount of data sent and the original window size. In effect, the client calculates that the window size has been reduced, which is referred to as "window shrinking." Thus, if a server abruptly advertises a data window of zero, this situation might not be handled well by some clients, causing erroneous behavior, including system crashes. Insofar as the point of advertising a data window of zero is to place the clients in a persist state so that the server's connection with them can be maintained by another server, where the clients prematurely end the connection, this goal is ultimately not achieved.

For these and other reasons, therefore, there is a need for the present invention.

SUMMARY OF THE INVENTION

The present invention relates to maintaining a connection when one node takes over for another node. A method of an embodiment of the invention is specifically for maintaining a connection between a first node and a second node within a computer network. The second node receives first data from the first node and places the first data received within a data window. A third node taking over the connection from the second node receives second data from the first node and places the second data received within the data window. Upon the data window being completely filled, the third node closes the window and responds to the first node with an acknowledgment of a zero data window. The connection between the first node and the second node is maintained by the third node.

A method of another embodiment of the invention is performed by a replacing node, which is the node that is taking over a connection from a to-be-replaced node between the to-be-replaced node and a client node. The replacing node receives a copy of a data window partially filled with first data received by the to-be-replaced node from the client node. As a result, the connection between the client node and the to-be-replaced node is maintained by the replacing node. Second data is received by the replacing node from the client node until the data window is completely filled. The replacing node closes the data window and responds to the client node with a zero data window.

A method of a third embodiment of the invention is performed by a to-be-replaced node, which is the node that has a connection with a client node that is to be taken over by a replacing node. The to-be-replaced node sends a copy of a data window as partially filled with first data received from the client node to the replacing node. The to-be-replaced node also sends to the replacing node a copy of an acknowledgment. This allows the replacing node to form its own acknowledgements to be sent to the client node as the data window is filled. When the data window is completely filled by the replacing node receiving second data from the client node, a zero data window is sent. The connection between it and the client node is maintained by the replacing node.

A computerized system of an embodiment of the invention includes first, second, and third nodes communicatively coupled with one another, such as over a network. The second node has a connection with the first node in which first data received from the first node is placed by the second node in a data window. The third node takes over the connection with the first node from the second node, such that the third node is to place second data received from the first node in the data window and thereafter is to close the data window and send an acknowledgment with a zero window to the first node.

An article of manufacture of an embodiment of the invention includes a tangible computer-readable medium and means in the medium. The tangible computer-readable medium may be a recordable data storage medium, or another type of tangible computer-readable medium. The means is for receiving from a to-be-replaced node a copy of a data window partially filled with first data received from a client node. The means is further for receiving second data from the client node until the data window is completely filled, and for closing the data window and responding to the client node with an acknowledgment.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
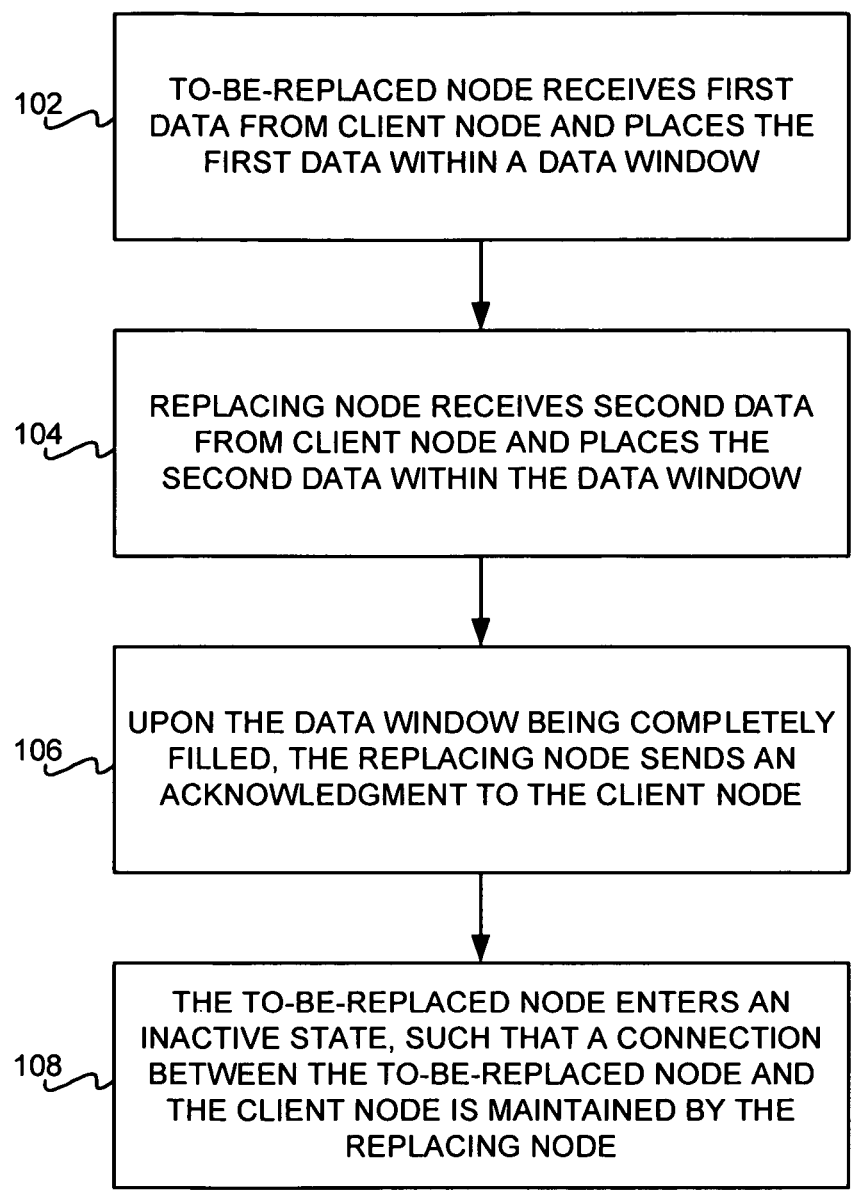
FIG. 1 is a flowchart of a method for maintaining a connection when one node takes over for another node, according to a preferred embodiment of the invention, and is suggested for printing on the first page of the patent.

FIG. 1 shows a method 100 for maintaining a connection between a to-be-replaced node and a client node by a replacing node, according to an embodiment of the invention. The to-be-replaced node is the node that is to be replaced by another node, in this case the replacing node. The client node is a node that has a connection with the to-be-replaced node, where this connection is to be maintained by the replacing node when the replacing node takes over for the to-be-replaced node. All three of these nodes are communicatively connected to one another over a network, such as one or more of a local area network (LAN), a wide-area network (WAN), an intranet, an extranet, the Internet, a wired network, and a wireless network, as well other types of networks. The nodes may communicate with one another over the network via a given networking protocol, such as the Transmission Control Protocol/Internet Protocol (TCP/IP). Each of the nodes may be a computing device. Furthermore, the to-be-replaced node and the replacing node may be server computing devices, such that the to-be-replaced server is being migrated to the replacing server, whereas the client node may be a client computing device.

It is noted that the steps depicted in the method 100 of FIG. 1 can in some embodiments represent some but not all the parts to be performed by the various nodes. A more detailed method is presented later in the detailed description, in relation to FIG. 4, in which additional that may be performed by the nodes are described. That is, the method 100 is to be considered as a general exemplary embodiment of the invention, detailing the minimum number of parts that are to be performed by various nodes in order to achieve connection maintenance in accordance with the invention.

First, the to-be-replaced node receives first data from the client node, and places the first data within a data window (102). That is, the to-be-replaced node may have previously advertised a data window of a given size to the client node. In response, the client node sends to the to-be-replaced node first data that is intended to fill this data window. The first data sent from the client node represents an amount of data that is less than the size of the window, however. The terminology "first data" is meant only to distinguish the data sent from the client node that is received by the to-be-replaced node, from, for instance, other data sent from the client node that is received by the replacing node.

Next, the replacing node receives second data from the client node, and places the second data within the data window (104). The replacing node knows that it should take the second data from the client node, because it knows a priori that it is replacing the to-be-replaced node. The replacing node may have received a copy of the data window as has been partially filled with the first data from the to-be-replaced node. The replacing node thus places the second data in the data window after the point where the first data has been placed in the data window. At some point, the data window becomes completely filled. It is noted that the replacing node preferably does not expand the data window, as can otherwise be achieved by some networking protocols. That is, the data window is allowed to close once it becomes full.

In another embodiment, the node that is taking over the connection is provided only the size of the window and the remaining open window, but not the data itself. This node is also provided the sequence number of the last data that the to-be-replaced node transmitted. The node in question then accepts new data, and uses the information provided to it to respond with an acknowledgement packet. The window decreases in accordance with the data received until the window size is zero. Once the original node is back up or the replacing node is ready to acquire the connection, all this information is passed to either the original node or is used by the replacing node. The replacing node can then restart communication by opening the window.

It is noted further that the replacing node may have taken over the network address, such as an Internet Protocol (IP) address, of the to-be-replaced node, just before it begins to receive the second data from the client node, and just after the to-be-replaced node receives the first data from the client node. Thus, the client node sends a data flow including the first data and the second data to the same network address, where the to-be-replaced node actually captures the first data of the data flow and places it in the data window, and the replacing node actually captures the second data of the data flow and places it in the data window. The takeover of the to-be-replaced node by the replacing node—that is, the takeover of the network address of the to-be-replaced node by the replacing node—is preferably sufficiently fast that this data flow from the client node is not interrupted. However, if the failover is delayed, a few retransmissions of data from the client may occur. Furthermore, the first node is unaware that the second data of the data flow is received by a different node, the replacing node, than the node that received the first data of the data flow, the to-be-replaced node.

Once the data window has been completely filled, then, the replacing node sends an acknowledgement with a data window of zero to the client node (106), acknowledging that the entire data flow of the client node has been received and no further data can be received. The acknowledgment may be dependent on the first and the second data that has filled the data window. That is, the acknowledgment may be indicative of the first and the second data.

The to-be-replaced node enters an inactive state (108), such that a connection between the to-be-replaced node and the client node is maintained by the replacing node, which has successfully taken over for the to-be-replaced node. Entry by the to-be-replaced node into the inactive state may occur at any time after the to-be-replaced node has received the first data in part 102 of the method 100. For instance, the to-be-replaced node may enter an inactive state while the replacing node is receiving the second data from the client node in part 104 of the method 100.

The inactive state of the to-be-replaced node means that the to-be-replaced node is no longer maintaining the connection that was previously between it and the client node. The to-be-replaced node may be shutdown, for instance, or otherwise may now be the subject of maintenance operations. The client node preferably is unaware that the to-be-replaced node with which it has previously established the connection has been taken over by the replacing node, such that this connection is being maintained by the replacing node. That is, the takeover process is transparent to the client node.

It is noted that the invention can take the form of an entirely hardware embodiment, an entirely software embodiment or an embodiment containing both hardware and software elements. In one embodiment, for instance, the invention is implemented in software, which includes but is not limited to firmware, resident software, microcode, and so on.

Furthermore, embodiments of the invention can take the form of a computer program product accessible from a computer-usable or tangible computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a tangible computer-readable medium include a semiconductor or solid-state memory, magnetic tape, a removable computer diskette, a random access memory (RAM), a read-only memory (ROM), a rigid magnetic disk and an optical disc. Current examples of optical discs include a compact disc-read only memory (CD-ROM), a compact disc-read/write (CD-RW) and a digital versatile disc (DVD).

Technical Background and Implementation

Figure 2:
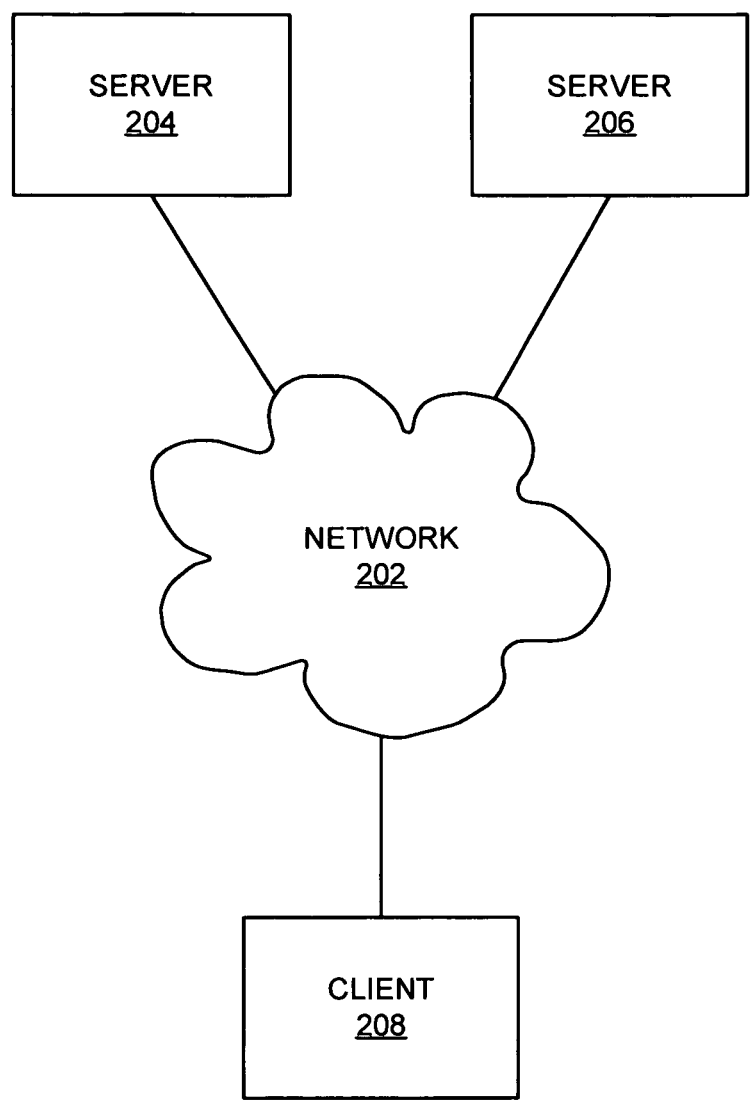
FIG. 2 is a diagram of a computerized system in which one node takes over for another node, according to an embodiment of the invention.

FIG. 2 shows a computerized system 200, according to an embodiment of the invention. The system 200 is depicted in FIG. 2 as including servers 204 and 206, and a client 208 communicatively coupled to one another over a network 202. As can be appreciated by those of ordinary skill within the art, the system 200 can include additional servers, besides the servers 204 and 206, as well as additional clients, besides the client 208. The servers 204 and 206 and the client 208 are more generally nodes of the network 202, and each may be a computing device in one embodiment of the invention. The network may be one or more of a local area network (LAN), a wide-area network (WAN), an intranet, an extranet, the Internet, a wired network, and a wireless network, as well another type of network.

The client 208 has a connection with the server 204. As a result, the client 208 sends data to the server 204, and receives data from the server 204, within this connection. The server 204, as well as the client 208 and the server 206, each has a network address, such as an Internet Protocol (IP) address, that identifies it on the network 202. The client 208 thus sends data to the server 204 via the network address of the server 204, and the server 204 sends data to the client 208 via the network address of the client 208. Communication over the network 202 occurs within the auspices of a network protocol, such as the Transmission Control Protocol/Internet Protocol (TCP/IP), as can be appreciated by those of ordinary skill within the art. The connection between the server 204 and the client 208 may therefore be referred to as a discrete TCP/IP session in one embodiment.

At some point, it is determined that the server 204 is to be replaced by the server 206. For example, the server 204 may need to undergo maintenance or repair, and therefore the server 206 has been selected to take over for the server 204. So as not to terminate the connections currently being maintained by the server 204, the server 206 maintains these connections for the server 204, either indefinitely or for a set period of time, until the server 204 comes back online. The manner by which the server 206 takes over for the server 204, and maintains the connections of the server 204, such as the connection between the server 204 and the client 208, is as has been described in relation to FIG. 1, and as is described in more detail in the next section of the detailed description.

Figure 3:
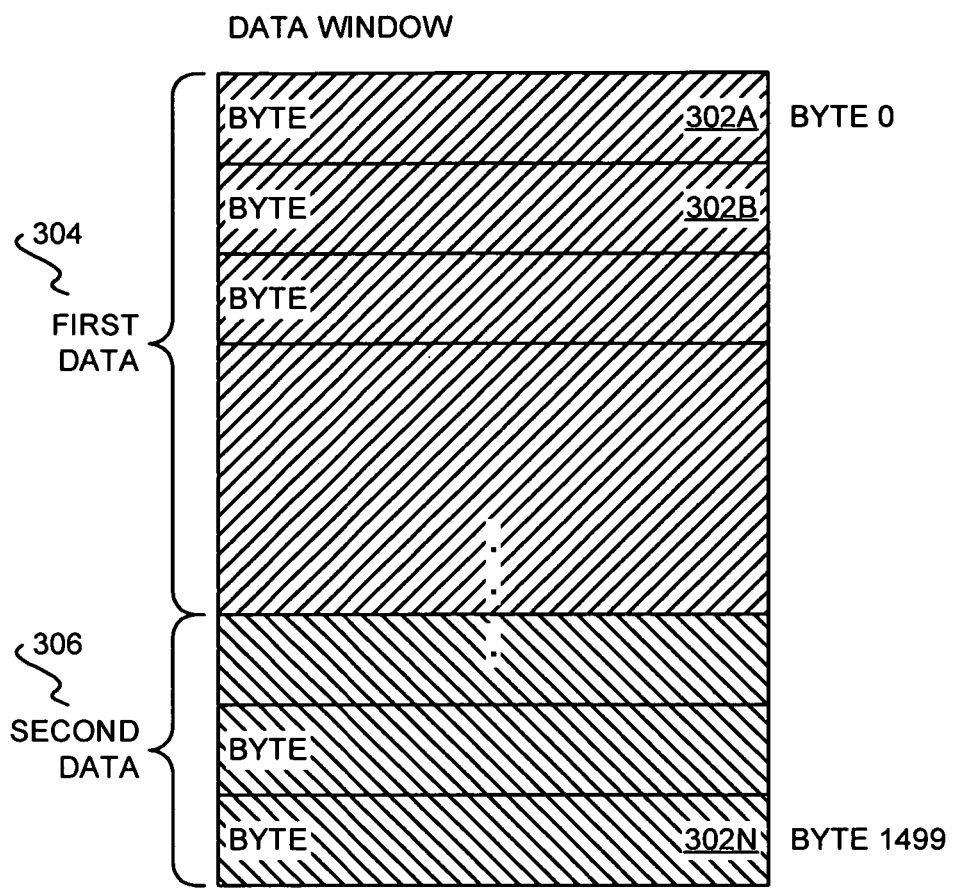
FIG. 3 is a diagram of how one node takes over for another node, in relation to a data window filled with data received from a client node, according to an embodiment of the invention.

FIG. 3 shows an exemplary data window 300, according to an embodiment of the invention, in relation to which the takeover from the server 204 by the server 206 is described in detail. The server 204 advertises the data window 300 to the client 208. That is, the server 204 communicates to the client 208 that it has a data window 300 with a given size that the client 208 can fill with data to be received by the server 204. In the example of FIG. 3, the data window 300 is 1,500 bytes in size for example purposes only, and includes bytes 302A, 302B, ..., 302N, collectively referred to as the bytes 302 of the data window 300, where the byte 302A corresponds to the first byte 0, and the byte 302N corresponds to the last byte 1499.

In response to receiving the advertisement of the data window 300 by the server 204, the client 208 begins sending data to the server 204. This data is indicated in FIG. 3 as the first data 304. As the server 204 receives the first data 304, it fills the data window 300. Arbitrarily during the receipt of the data from the client 208, the server 204 is identified for entry into an inactive state, such that the server 206 is to take over for the server 204 and maintain the connection with the client 208. Additional data sent by the client 208 after the first data 304 is thus received by the server 206, and is indicated in FIG. 3 as the second data 306. Once all the second data 306 has been received, the data window 300 is completely full, and the server 206 sends an acknowledgment to the client 208 that its data flow as to the window 300, including the first data 304 and the second data 306, has been received.

Therefore, between the last byte of the first data 304 sent by the client 208 and the first byte of the second data 306 sent by the client 208, the server 206 takes over the network address of the server 204. Thus, the client 208 continues to send the bytes of data of the data flow to the same network address. However, after the last byte of the first data 304 is sent by the client 208, the server 206 has taken over the network address of the server 204, such that while the last byte of the first data 304 sent by the client 208 is received by the server 204, the first byte of the second data 306 sent by the client 208 is received by the server 206. From the perspective of the client 208, this network address takeover process is transparent, and is sufficiently fast that the transfer of data by the client 208 is not interrupted.

Before the server 206 has actually taken over the network address of the server 204, such that it receives subsequent data sent by the client 208, the server 204 may transmit to the server 206 a copy of the data window 300. That is, the server 204 may send the server 206 the data window 300 as has been partially filled with the first data 304. This enables the server 204 to have a complete copy of the data window 300 as has been thus far filled with the first data 304 received from the client 208. Furthermore, the server 204 may send the server 206 other information regarding the data window 300. For instance, the server 204 may send the server 206 the initial sequence number, as well as the most recently acknowledged data in the data window 300, or the most recent data that has not been acknowledged.

All of the above information may be needed by the server 206 to properly maintain the connection with the client 208 in a seamless manner. For instance, this information may be needed by the server 206 to properly formulate an acknowledgment to send to the client 208. Therefore, it is said in one embodiment of the invention that the server 204 sends the server 206 a copy of the acknowledgment that is to be sent to the client 208 once the data window 300 has been completely filled. This means that the server 204 sends the server 206 at least some of the information that the server 206 will need to formulate the acknowledgment that the server 206 will ultimately send to the client 208 once the data window 300 has been completely filled.

Detailed Method

Figure 4:
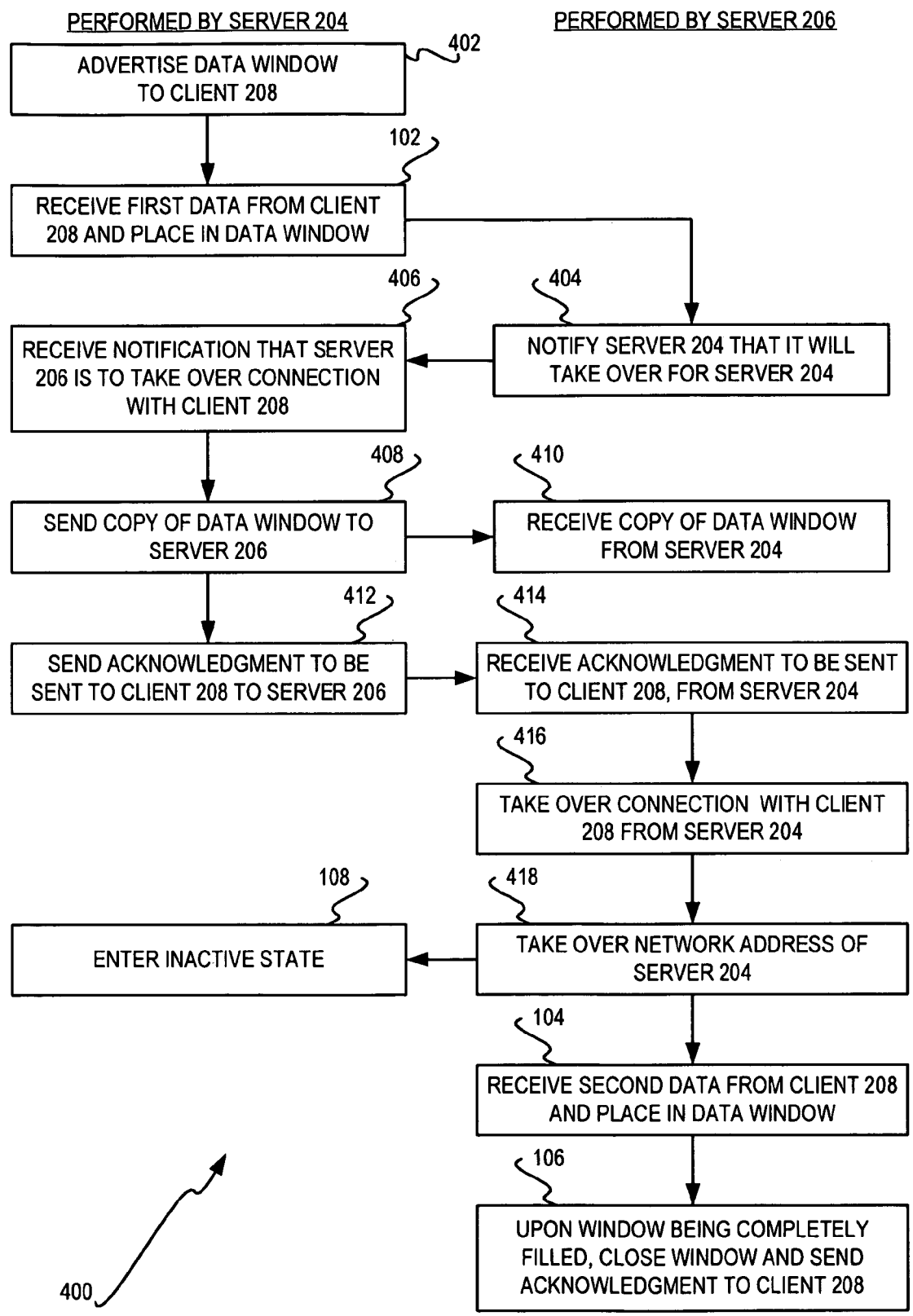
FIG. 4 is a flowchart of a method for maintaining a connection when one node takes over for another node, which is more detailed than but consistent with the method of FIG. 1, according to an embodiment of the invention.

FIG. 4 shows a method 400 for maintaining a connection between a first node and a second node when the second node is being replaced by a third node, according to an embodiment of the invention. The method 400 is consistent with but more detailed than the method 100 of FIG. 1. The connection between the first and the second nodes is maintained in the method 400 such that when the third node takes over for the second node, the connection between the first node and the second node is maintained by the third node, and is not terminated.

The method 400 is specifically described in relation to the server 204, the server 206, and the client 208 of FIG. 2 for descriptive clarity. Thus, as shown in FIG. 4, the parts of the method 400 on the left-hand side are performed by the server 204, which is the first node that is to be replaced, and the parts of the method 400 on the right-hand side are performed by the server 206, which is the third node that is to replace the first node. The client 208 in this case is the second node with which the first node (i.e., the server 204) has a connection that is to be maintained by the third node (i.e., the server 206). However, it is noted that the method 400 is applicable to the server 206 taking over all client connections from the server 204. That is, whereas the method 400 is described in relation to a representative and solitary client 208, such description is for convenience and clarity only. In actuality, the server 206 can take over all the client connections from the server 204 in the same way as is described in particular relation to the client 208.

The server 204 advertises a data window to the client 208 (402). The data window has a specified size, which is the number of bytes of data that the client 208 is allowed to transmit to the server 204 within a data flow. The server 204 therefore receives data, which is referred to as first data, from the client 208, and places it in the data window (102).

The server 206 then notifies the server 204 that the server 206 will be taking over for the server 204 (404). The server 204 receives this notification that the server 206 is to take over its connection with the client 208 (406). Alternatively, rather than the server 206 indicating to the server 204 that it will take over the connection between the server 204 and the client 208, a different computing device or other node may provide such notification to the server 204.

In response, the server 204 in one embodiment sends a copy of the data window to the server 206 (408), where this data window has been partially filled with the first data received by the server 204 from the client 208. The server 206 thus receives the copy of the data window as sent by the server 204 (410). In addition, in one embodiment, the server 204 sends to the server 206 at least a portion of the acknowledgment to be sent to the client 208 by the server 206 once the data window is completely filled (412). For instance, the server 204 may send the server 206 at least some of the information that the server 206 will need to formulate the acknowledgment that the server 206 will ultimately send to the client 208 once the data window 300 has been completely filled. The server 206 thus receives the copy of the acknowledgment as sent by the server 204 (414).

The server 206 is now ready to take over the connection with the client 208 from the server 204 (416). For instance, the server 206 takes over, or assumes, the network address of the server 204 (418), so that any further data sent to this network address by the client 208 is received by the server 206 instead of by the server 204. The server 204 can then enter an inactive state (108), where its previous connection with the client 208, rather than being terminated, is maintained by the server 206. It is noted that preferably that the takeover for the server 204 by the server 206 is accomplished fast enough that it occurs without the data flow being sent by the client 208 being interrupted. That is, the takeover is accomplished between the last byte of the first data sent by the client 208, which is the last byte of data sent by the client 208 received by the server 204, and the first byte of the second data sent by the client 208, which is the first byte of data sent by the client 208 received by the server 206.

Thus, the server 206 receives the second data from the client 208, and places it in the data window (104). Thus, the server 206 may have received a copy of the data window as has been partially filled with the first data from the server 204, and fills the remainder of that window with the second window. Alternatively, the server 206 may have just received the size of the window and the remaining open window, but not the first data itself, and fills the remaining open window with the second data. It is noted that multiple transmissions of second data may cause intermediate acknowledges to be sent with the current window size.

However, at some point, the data window is completely filled. Therefore, upon the data window being completely filled, the server 206 closes the window, and sends the acknowledgment to the client 208 (106). The acknowledgment may be dependent on the first and the second data that has filled the data window. The acknowledgment acknowledges the entire data flow from the client (including both the first and the second data), and that no further data can be received. Thus, the server 206 has taken over the connection between the server 204 and the client 208 from the perspective of the server 204, without the client 208 necessarily being aware that this takeover occurred. Throughout the data transmission process by the client 208, the client 208 sends both the first data and the second data of the data flow to the same network address, where the network address is first that of the server 204, and then is taken over by the second server 206 quickly enough that the data flow is not interrupted. Once the original node is ready to restart, the connection may be failed back to the original node.

ADVANTAGES AND CONCLUSION

Embodiments of the invention provide for advantages over the prior art. Unlike the prior art, for instance, the invention does not require a data window of zero being sent by the node being replaced to the client node with which it has a connection. Rather, the node being replaced fills the window with first data received from the client node. When the node replacing the node being replaced is ready, it takes over for the node being replaced, and finishes filling the window with second data received from the client node. Thus, where the takeover is fast enough, the data flow from the client node, which includes the first and the second data sent by the client node, is not interrupted by the node taking over the connection. As a result, the client node is unaware that the first data is received by one node, and the second data is received by another node. Because the client node never receives an advertisement of a data window of zero abruptly, such that the window is not prematurely shrunk, embodiments of the invention can be implemented even in relation with such client nodes that do not handle receipt of window shrinking to zero gracefully.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, the methods of different embodiments of the invention that have been described can be implemented as computer programs that are stored on computer-readable media of articles of manufacture. Such computer-readable media may be tangible computer-readable media, like recordable data storage media. Therefore, it is manifestly intended that this invention be limited only by the claims and equivalents thereof.

I claim:

1. A method for maintaining a connection between a first node and a second node within a computer network comprising:
    the second node receiving first data from the first node and placing the first data received within a data window;
    a third node taking over the connection from the second node receiving second data from the first node and placing the second data received within the data window; upon the data window being completely filled, the third node closing the data window and responding to the first node with a zero data window; and
    wherein the connection between the first node and the second node is maintained by the third node.

2. The method of claim 1, wherein the third node does not permit the data window to be expanded and allows the data window to be closed.

3. The method of claim 1, further comprising the second node providing the third node with a copy of the data window as partially filled with the first data received from the first node.

4. The method of claim 1, further comprising the third node indicating to the second node that the third node will begin receiving the second data from the first node and placing the second data received within the data window.

5. The method of claim 1, wherein the third node responding to the first node comprises the third node sending the first node an acknowledgement is indicative at least of the first data and the second data sent by the first node.

6. The method of claim 1, wherein the second node has a network address by which the first node communicates with the second node, the method further comprising the third node taking over the network address of the second node.

7. The method of claim 6, wherein the network address of the second node is an Internet Protocol (IP) address.

8. The method of claim 1, wherein the first node is unaware that the first data is received by the second node and that the second data is received by the third node.

9. The method of claim 1, wherein the first data and the second data sent from the first node are sent in accordance with the Transmission Control Protocol/Internet Protocol (TCP/IP).

10. The method of claim 1, wherein the first node is a client computing device.

11. The method of claim 1, wherein the second node is a first server computing device, and the third node is a second server computing device to which the first server is being migrated.

12. A method comprising:
    receiving, by a replacing node taking over a connection with a client node from a to-be-replaced node, a copy of a data window partially filled with first data received by the to-be-replaced node from the client node, such that the connection between the client node and the to-be-replaced node is maintained by the replacing node;
    receiving second data by the replacing node from the client node until the data window is completely filled; and
    closing the data window by the replacing node and responding to the client node with a zero data window.

13. The method of claim 12, further comprising placing the second data received by the replacing node from the client node within the data window.

14. The method of claim 12, further comprising receiving by the replacing node from the to-be-replaced node a copy of the acknowledgement to be sent to the client node upon the data window being completely filled.

15. The method of claim 12, wherein the to-be-replaced node has a network address by which the client node communicates with the to-be-replaced node, the method further comprising the replacing node taking over the network address of the to-be-replaced node.

16. The method of claim 12, wherein the client node is unaware that the first data is received by the to-be-replaced node and the second data is received by the replacing node.

17. A method comprising:
sending, by a to-be-replaced node to a replacing node taking over a connection with a client node from the to-be-replaced node, a copy of a data window as partially filled with first data received by the to-be-replaced node from the client node;
sending by the to-be-replaced node to the replacing node a copy of an acknowledgment to be sent to the client node by the replacing node upon the data window being completely filled upon the replacing node receiving second data from the client node; and
wherein the connection between the client node and the to-be-replaced node is maintained by the replacing node.

18. The method of claim 17, further comprising receiving the first data by the to-be-replaced node from the client node and placing the first data within the data window.

19. The method of claim 17, wherein the to-be-replaced node has a network address by which the client communicates with the to-be-replaced node, such that the replacing node takes over the network address of the to-be-replaced node.

20. The method of claim 17, wherein the client node is unaware that the first data is received by the to-be-replaced node and the second data is received by the replacing node.

21. A computerized system comprising:
a first node;
a second node communicatively coupled to the first node such that the second node has a connection with the first node in which first data received from the first node is placed by the second node in a data window; and
a third node communicatively coupled to the first node and the second node, the third node taking over the connection with the first node from the second node such that the third node is to place second data received from the first node in the data window and thereafter is to close the data window and send an acknowledgment to the first node,
wherein the first node, second node, and third node are implemented at least in hardware.

22. The computerized system of claim 21, wherein the second node is to provide the third node with a copy of the data window as partially filed with the first data received from the first node.

23. The computerized system of claim 21, wherein the second node is to provide the third node with a copy of the acknowledgment to be sent to the first node upon the data window being completely filled.

24. The computerized system of claim 21, wherein the second node has a network address by which the first node communicates with the second node, such that the third node takes over the network address of the second node.

25. The computerized system of claim 21, wherein the first node is unaware that the first data is received by the second node and the second data is received by the third node.

26. The computerized system of claim 21, wherein the second node is a first server computing system, and the third node is a second server computing system to which the first server computing system is being migrated.

27. An article of manufacture comprising:
a non-transitory computer-readable medium; and
means in the medium for receiving from a to-be-replaced node a copy of a data window partially filled with first data received from a client node, for receiving second data from the client node until the data window is completely filled and for closing the data window and responding to the client node with an acknowledgment.

28. The article of manufacture of claim 27, wherein the means is further for placing the second data received from the client node within the data window.

29. The article of manufacture of claim 27, wherein the means is further for receiving from the to-be-replaced node a copy of the acknowledgment to be sent to the client node upon the data window being completely filled.

30. The article of manufacture of claim 27, wherein the means is further for taking over a network address of the to-be-replaced node by which the client node communicates with the to-be-replaced node.

* * * * *